United States Patent
Curtis

(10) Patent No.: US 7,756,289 B2
(45) Date of Patent: Jul. 13, 2010

(54) IMAGE WATERMARKING SYSTEMS AND METHODS

(75) Inventor: Donald B. Curtis, Highland, UT (US)

(73) Assignee: Ancestry.com Operations Inc., Provo, UT (US)

( * ) Notice: Subject to any disclaimer, the term of this patent is extended or adjusted under 35 U.S.C. 154(b) by 1146 days.

(21) Appl. No.: 11/388,231

(22) Filed: Mar. 22, 2006

(65) Prior Publication Data

US 2007/0223779 A1 Sep. 27, 2007

(51) Int. Cl.
*G06K 9/00* (2006.01)
*G06K 9/46* (2006.01)

(52) U.S. Cl. .................. 382/100; 382/112; 382/190; 380/59

(58) Field of Classification Search .............. 382/100, 382/112, 190, 191, 274, 275; 380/54, 59, 380/1; 713/150
See application file for complete search history.

(56) References Cited

U.S. PATENT DOCUMENTS

| | | | | |
|---|---|---|---|---|
| 5,530,759 | A * | 6/1996 | Braudaway et al. | 380/54 |
| 5,854,857 | A * | 12/1998 | de Queiroz et al. | 382/232 |
| 6,049,627 | A * | 4/2000 | Becker et al. | 382/181 |
| 6,072,888 | A * | 6/2000 | Powell et al. | 382/100 |
| 6,577,744 | B1 * | 6/2003 | Braudaway et al. | 382/100 |
| 6,628,801 | B2 * | 9/2003 | Powell et al. | 382/100 |
| 6,827,257 | B2 * | 12/2004 | Kobayashi et al. | 235/375 |
| 6,945,455 | B2 * | 9/2005 | Kobayashi et al. | 235/375 |
| 7,054,462 | B2 * | 5/2006 | Rhoads et al. | 382/100 |
| 7,065,226 | B1 * | 6/2006 | Anzai et al. | 382/100 |
| 7,085,398 | B2 * | 8/2006 | Baudry et al. | 382/100 |
| 7,130,442 | B2 * | 10/2006 | Braudaway et al. | 382/100 |
| 7,133,534 | B2 * | 11/2006 | Epstein et al. | 382/100 |
| 7,171,020 | B2 * | 1/2007 | Rhoads et al. | 382/100 |
| 7,209,572 | B2 * | 4/2007 | Iwamura et al. | 382/100 |
| 7,266,217 | B2 * | 9/2007 | Rhoads et al. | 382/100 |
| 7,337,321 | B2 * | 2/2008 | Terada et al. | 713/176 |
| 7,400,743 | B2 * | 7/2008 | Rhoads et al. | 382/100 |
| 7,409,073 | B2 * | 8/2008 | Moskowitz et al. | 382/100 |

(Continued)

OTHER PUBLICATIONS

Nakamura et al "Fast Watermark Detection Scheme for Camera Equipped Cellular Phone" pp. 1-8.*

(Continued)

*Primary Examiner*—Matthew C Bella
*Assistant Examiner*—Mia M Thomas
(74) *Attorney, Agent, or Firm*—Townsend and Townsend and Crew LLP

(57) ABSTRACT

A method of determining a location for a watermark on an image having an array of pixels, each pixel having image information associated therewith includes determining a size for the watermark. The size has a pixel height and a pixel width. The method also includes calculating a region brightness value for each of a plurality of regions of the image. Each of the plurality of regions has a pixel height and a pixel width equal to the pixel height and the pixel width of the watermark. Each of the plurality of regions includes a plurality of pixels and the brightness value is representative of the image information associated with the plurality of pixels comprised by the region. The method also includes selecting one of the plurality of regions as the location for the watermark. The selection is based, at least in part, on the brightness value for the region.

18 Claims, 2 Drawing Sheets

U.S. PATENT DOCUMENTS

| | | | |
|---|---|---|---|
| 7,539,325 B2 * | 5/2009 | Rhoads et al. | 382/100 |
| 2001/0053237 A1 * | 12/2001 | Hashimoto | 382/100 |
| 2002/0090110 A1 * | 7/2002 | Braudaway et al. | 382/100 |
| 2003/0128860 A1 * | 7/2003 | Braudaway et al. | 382/100 |
| 2003/0165253 A1 * | 9/2003 | Simpson et al. | 382/100 |
| 2003/0219143 A1 * | 11/2003 | Moskowitz et al. | 382/100 |
| 2004/0032953 A1 * | 2/2004 | Silverbrook et al. | 380/54 |
| 2004/0071311 A1 * | 4/2004 | Choi et al. | 382/100 |
| 2004/0141632 A1 * | 7/2004 | Miyake et al. | 382/100 |
| 2005/0180594 A1 * | 8/2005 | Isogai | 382/100 |
| 2005/0213790 A1 * | 9/2005 | Rhoads et al. | 382/100 |
| 2006/0251320 A1 * | 11/2006 | Diederichs et al. | 382/165 |
| 2007/0172095 A1 * | 7/2007 | Isogai | 382/100 |

OTHER PUBLICATIONS

ACM Search History—see attached.*

* cited by examiner

IMAGE WATERMARKING SYSTEMS AND METHODS

CROSS-REFERENCES TO RELATED APPLICATIONS

This application is related to co-pending, commonly assigned, U.S. patent application Ser. No. 11/188,137 entitled, "ADAPTIVE CONTRAST CONTROL SYSTEMS AND METHODS," filed on Jul. 21, 2005, the entire disclosure of which is herein incorporated by reference for all purposes.

BACKGROUND OF THE INVENTION

Embodiments of the present invention relate generally to electronic images. More specifically, embodiments of the invention relate to watermarking electronic images.

It has become increasingly commonplace for companies or individuals to offer images to customers. Because such entities desire to protect their investments in such images, there is a need to provide security with the images. This makes it more difficult for others to copy and resell the images or otherwise distribute them without permission. There is also a desire to identify the image owner for marketing purposes. By doing so, those who view the images will know where to obtain similar images.

One well-know method for identifying ownership of images and providing security is visible "watermarking." Visible watermarking is a technique whereby a text string, such as a company name and/or copyright information, or a smaller image, such as a company logo, is placed on an image being protected. Various well-known techniques exist for adding a watermark to an image. One is to place the watermark over the original content of the image, thereby replacing a portion of the original image with the watermark. Another method is to place the watermark on the image with less than 100% opacity so that the original image content is still visible and is not completely obstructed by the watermark. In both of these cases, however, the watermark may obscure content, which is particularly disadvantageous when the image content is text, the meaning of which may be lost, even if only a small portion is obscured. For these and other reasons, improved solutions for placing watermarks on images are desirable.

BRIEF SUMMARY OF THE INVENTION

Embodiments of the present invention thus provides a method of determining a location for a watermark on an image. The image comprises an array of pixels and each pixel has image information associated therewith. The method includes determining a size for the watermark. The size has a pixel height and a pixel width. The method also includes calculating a region brightness value for each of a plurality of regions of the image. Each of the plurality of regions has a pixel height and a pixel width equal to the pixel height and the pixel width of the watermark. Each of the plurality of regions includes a plurality of pixels and the brightness value is representative of the image information associated with the plurality of pixels comprised by the region. The method also includes selecting one of the plurality of regions as the location for the watermark. The selection is based, at least in part, on the brightness value for the region.

In such embodiments, the image information for each pixel may include a grayscale value for the pixel. The region brightness value for each of the plurality of regions may be a cumulative grayscale value comprising a summation of the pixel grayscale values for the plurality of pixels in the region. The image may be a black-on-white image selecting one of the plurality of regions may include selecting a region having a highest cumulative grayscale value. The image may include a white-on-black image and selecting one of the plurality of regions may include selecting a region having a lowest cumulative grayscale value. The image information for each pixel may include color information and the method may include obtaining brightness information from the color information. Calculating a region brightness value for each of a plurality of regions of the image may include, for a watermark of height h and width w, for a first column of pixels, calculating a row brightness value for each pixel in the column. The row brightness value may include a summation of image information for w contiguous pixels in the row. The method also may include, for a first group of h contiguous pixels in the first column of pixels, calculating a region brightness value by summing the row brightness values for the h contiguous pixels in the first column of pixels. The method may further include, for a second group of h contiguous pixels in the first column of pixels, calculating a region brightness value by adding one row brightness value and subtracting a different row brightness value. The method also may include, for a second column of pixels, calculating a row brightness value for each pixel in the column by adding image information for one pixel and subtracting image information for a different pixel. The method may further include, for a first group of h contiguous pixels in the second column of pixels, calculating a region brightness value by summing the row brightness values for the h contiguous pixels in the second column of pixels and for a second group of h contiguous pixels in the second column of pixels, calculating a region brightness value by adding one row brightness value and subtracting a different row brightness value.

In other such embodiments, calculating a region brightness value for each of a plurality of regions of the image may include, for a first column of pixels, calculating a row brightness value for each pixel in the column. The row brightness value includes a summation of image information for h contiguous pixels in the row. The method also may include for a first group of w contiguous pixels in the first column of pixels, calculating a region brightness value by summing the row brightness values for the w contiguous pixels in the first column of pixels. The method includes, for a second group of w contiguous pixels in the first column of pixels, calculating a region brightness value by adding one row brightness value and subtracting a different row brightness value. The method also includes, for a second column of pixels, calculating a row brightness value for each pixel in the column by adding image information for one pixel and subtracting image information for a different pixel. The method further includes, for a first group of w contiguous pixels in the second column of pixels, calculating a region brightness value by summing the row brightness values for the w contiguous pixels in the second column of pixels and, for a second group of w contiguous pixels in the second column of pixels, calculating a region brightness value by adding one row brightness value and subtracting a different row brightness value.

In still other such embodiments, calculating a region brightness value for each of a plurality of regions of the image may include, for a watermark of height h and width w, for a first row of pixels, calculating a column brightness value for each pixel in the row. The column brightness value includes a summation of image information for h contiguous pixels in the column. The method also may include, for a first group of w contiguous pixels in the first row of pixels, calculating a region brightness value by summing the column brightness values for the w contiguous pixels in the first row of pixels, for a second group of w contiguous pixels in the first row of pixels, calculating a region brightness value by adding one column brightness value and subtracting a different column brightness value, for a second row of pixels, calculating a column brightness value for each pixel in the row by adding image information for one pixel and subtracting image information for a different pixel, for a first group of w contiguous pixels in the second row of pixels, calculating a region brightness value by summing the column brightness values for the w contiguous pixels in the second row of pixels, and, for a second group of w contiguous pixels in the second row of pixels, calculating a region brightness value by adding one column brightness value and subtracting a different column brightness value.

In still other such embodiments, calculating a region brightness value for each of a plurality of regions of the image further includes, for a first row of pixels, calculating a column brightness value for each pixel in the row. The column brightness value includes a summation of image information for w contiguous pixels in the column. The method also may include, for a first group of h contiguous pixels in the first row of pixels, calculating a region brightness value by summing the column brightness values for the h contiguous pixels in the first row of pixels, for a second group of h contiguous pixels in the first row of pixels, calculating a region brightness value by adding one column brightness value and subtracting a different column brightness value, for a second row of pixels, calculating a column brightness value for each pixel in the row by adding image information for one pixel and subtracting image information for a different pixel, for a first group of h contiguous pixels in the second row of pixels, calculating a region brightness value by summing the column brightness values for the h contiguous pixels in the second row of pixels, and, for a second group of h contiguous pixels in the second row of pixels, calculating a region brightness value by adding one column brightness value and subtracting a different column brightness value.

Other embodiments provide a method of determining a location for a watermark on an image. The image includes an array of pixels and each pixel has a grayscale brightness value associated therewith. The method includes determining a size for the watermark. The size has a pixel height h and a pixel width w. The method also includes calculating a region brightness value for each of a plurality of regions of the image. The plurality of regions has a pixel height and a pixel width equal to the pixel height and the pixel width of the watermark. Each of the plurality of regions includes a plurality of pixels. The region brightness value is a summation of the grayscale brightness values of the plurality of pixels comprised by the region. Calculating a brightness value for each of a plurality of regions of the image includes, for a first column of pixels, calculating a row brightness value for each pixel in the column. The row brightness value includes a summation of image information for w contiguous pixels in the row. The method further includes, for a first group of h contiguous pixels in the first column of pixels, calculating a region brightness value by summing the row brightness values for the h contiguous pixels in the first column of pixels. The method also includes, for a second group of h contiguous pixels in the first column of pixels, calculating a region brightness value by adding one row brightness value and subtracting a different row brightness value, for a second column of pixels, calculating a row brightness value for each pixel in the column by adding image information for one pixel and subtracting image information for a different pixel, for a first group of h contiguous pixels in the second column of pixels, calculating a region brightness value by summing the row brightness values for the h contiguous pixels in the second column of pixels, and, for a second group of h contiguous pixels in the second column of pixels, calculating a region brightness value by adding one row brightness value and subtracting a different row brightness value. The method further includes selecting one of the plurality of regions as the location for the watermark. The selection is based, at least in part, on the region brightness value for the region.

Other embodiments provide a system for placing a watermark on an electronic image. The system includes a processor and software that programs the processor to receive the electronic image. The electronic image includes an array of pixels and wherein each pixel has image information associated therewith. The software also programs the processor to calculate a region brightness value for each of a plurality of regions of the image. Each of the plurality of regions has a pixel height and a pixel width equal to height and a width of the watermark. Each of the plurality of regions includes a plurality of pixels and the brightness value is representative of the image information associated with the plurality of pixels comprised by the region. The software also programs the system to select one of the plurality of regions as the location for the watermark. The selection is based, at least in part, on the brightness value for the region. The software also programs the system to place the selected watermark at the location and store the watermarked image. The system also includes an image server configured to host watermarked images, advertise the availability of the watermarked image to customers, and provide the watermarked image to a customer upon request.

In such embodiments, the image information for each pixel includes a grayscale value for the pixel. In programming the processor to calculate a region brightness value for each of the plurality of regions, the software may program the processor to sum the pixel grayscale values for the plurality of pixels in the region. The image may be a black-on-white image and, in programming the processor to select one of the plurality of regions, the software may program the processor to select a region having a highest cumulative grayscale value. The image may be a white-on-black image and, in programming the processor to select one of the plurality of regions, the software may program the processor to select a region having a lowest cumulative grayscale value. The image information for each pixel may include color information and the software may further program the processor to obtain brightness information from the color information.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Embodiments of the invention provide systems and methods for placing visible watermarks on digital images. In some embodiments, watermarks are placed so as to minimize the possibility of obscuring image content. In some embodiments, watermarks are placed somewhat randomly so as to prevent automated removal thereof. In some embodiments, watermark placement is accomplished in a computationally-expeditious manner so as not to overly burden image production systems. Some embodiments accomplish all of the foregoing.

As will be explained in greater detail hereinafter, a watermark location is selected so as to minimize the possibility of obscuring data. This is accomplished by locating a portion of the document having the brightest area (or darkest area, in the case of negative images) that is the same size as the watermark.

Figure 1:
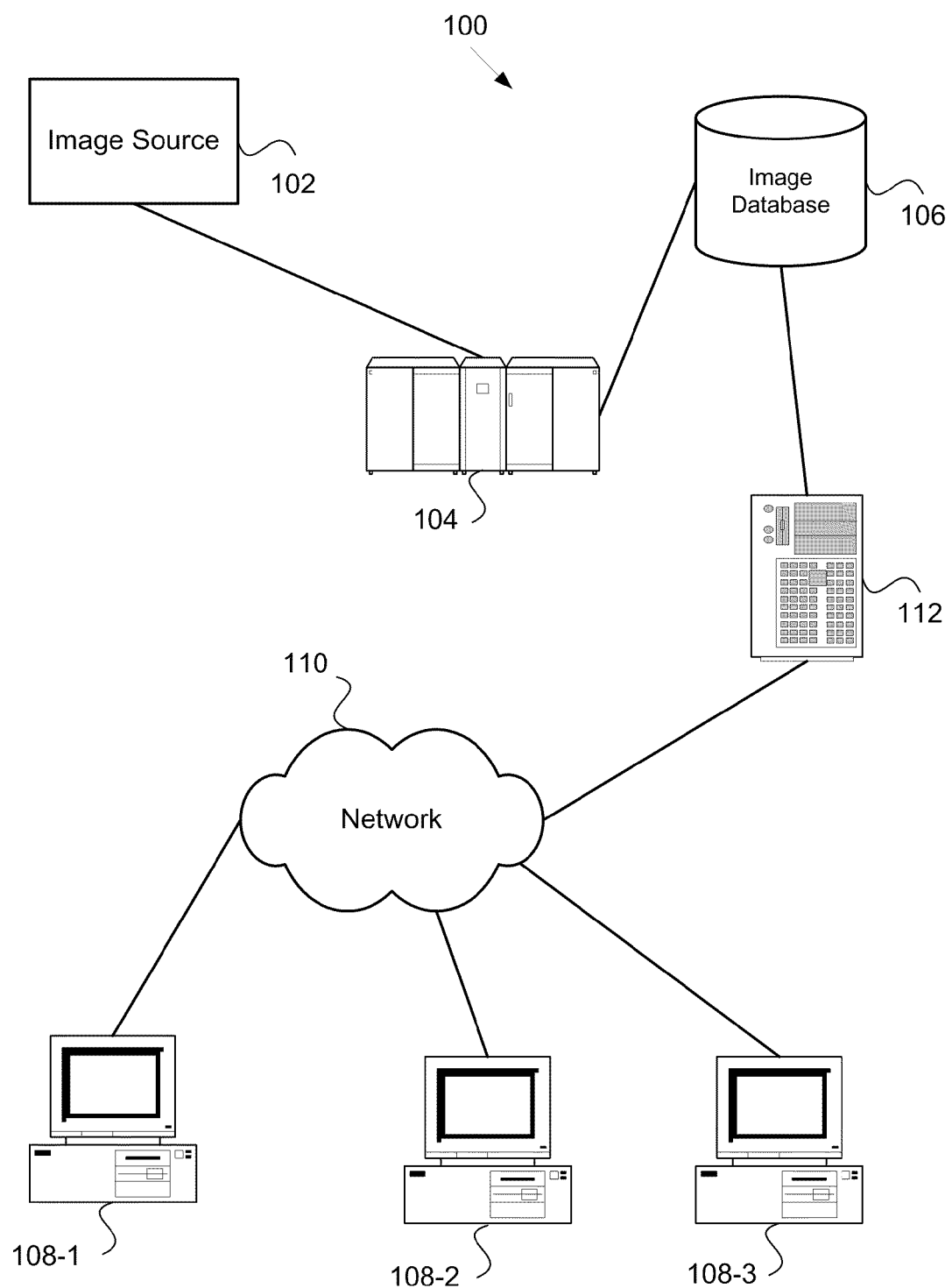
FIG. 1 illustrates an image production and sharing system according to embodiments of the invention.

Having described embodiments of the invention generally, attention is directed to FIG. 1, which illustrates an exemplary image production and sharing system 100 according to embodiments of the invention. Those skilled in the art will appreciate that the system 100 is merely exemplary of a number of possible system embodiments according to the invention. The system 100 includes an image source 102, a computing device 104 for processing images, and an image repository 106 for storing processed images.

The image source 102 sends electronic images to the computing system for placement of watermarks thereon. Hence, the image source 102 may be any of a variety of suitable image sources, including any device capable of receiving and forwarding electronic images, any device capable of producing electronic images from physical images, such as documents and photographs, and any device capable of converting electronic images to a suitable format.

In a specific embodiment, the computing device 104 operates on 8-bit grayscale images, although this is not a requirement. In such cases, the image source 102 may be a device that converts color images to grayscale for purposes of watermark placement. The image may be converted back to color after the watermark location is determined, or the watermark may be placed on a color image in a location determined using a grayscale version of the color image. In still other embodiments, a brightness value is used to determine the location of the watermark. Many other possibilities exist, as is apparent to those skilled in the art.

The computing device 104 may be any of a variety of computing devices. It evaluates the image, locating the brightest area for watermark placement, as will be described in greater detail with reference to FIG. 2. In some embodiments, the computing device 104 places the watermark and forwards the image with the watermark to the image database 106 for storage. In other embodiments, the computing device determines the location of the watermark and stores coordinate locations with the image for later placement of the watermark upon request of the image. In still other embodiments, the computing device 104, upon request of the image, determines a watermark location and sends the watermark to the requestor. The image database 106 may be any suitable storage medium, including optical, solid state, magnetic, and the like.

Thereafter, user computers 108 may, through a network 110, access an image server 112 that extracts selected images from the image database 106 and forwards them to the user. As is apparent, the images may be provided in any of a number of other ways to end users.

Figure 2:
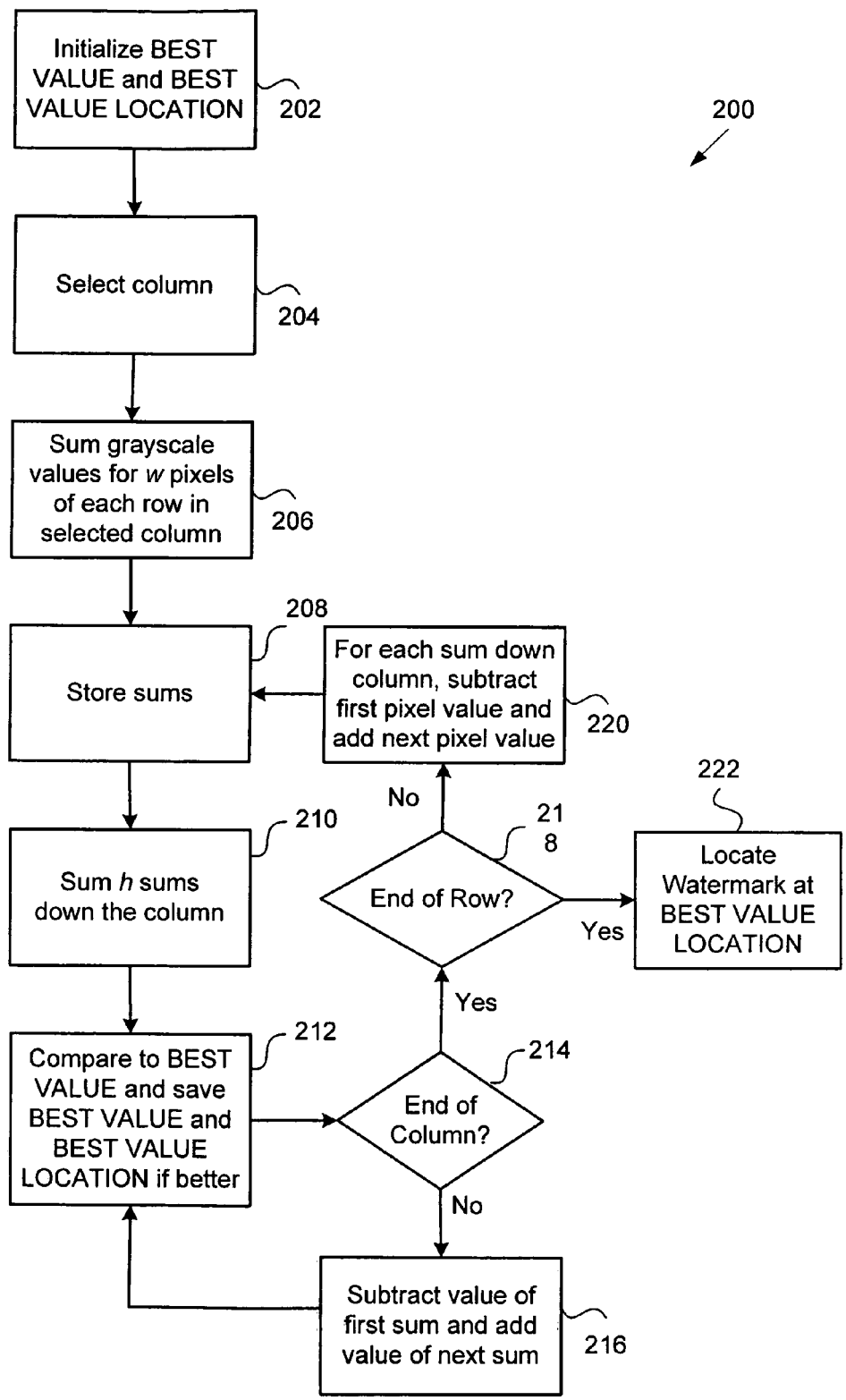
FIG. 2 illustrates a method of watermarking images according to embodiments of the invention.

Having described a system according to embodiments of the invention, attention is directed to FIG. 2, which illustrates a method 200 of placing a watermark according to embodiments of the invention. The method 200 may be implemented in the computing device 104 of FIG. 1 or other appropriate computing device. Those skilled in the art will appreciate that other methods according to other embodiments of the invention may include more, fewer, or different steps than those illustrated and described herein. Further, other methods according to other embodiments may traverse the steps illustrated and described here in different orders. For example, according to this embodiment, an image is processed down columns, then across rows. The same principles apply to processing images across (right to left or left to right) rows, then down (or up) columns.

The method 200 begins at block 202, at which point two variables are initialized: BEST VALUE and BEST VALUE LOCATION. Then at block 204, an initial column is selected. At block 206, for each row, starting with the pixel in the initial column, a brightness value of the first w pixels in the row are summed, w being the width, in pixels, of the watermark. The sums are stored in a matrix at block 208. The brightness value may be any of a variety of values indicative of a pixel's brightness. In some embodiments, the brightness value is a grayscale value. In other embodiments, the brightness value is an intensity value. In any case, the brightness value may be derived from other image information, such as, for example, color information. For example, a RGB image could be converted into a HSL or HSB image, in which case the lightness component or the brightness component, respectively, could be used. For ease of illustration, embodiments of the invention will be discussed in terms of grayscale.

At block 210, the first h sums in the matrix are summed, h being the height, in pixels, of the watermark. This result represents the total brightness of the first w×h area. At block 212, the result is compared to BEST VALUE, and if it is brighter than BEST VALUE, the new value is saved as BEST VALUE and the location is saved as BEST VALUE LOCATION.

It should be apparent that any identifying location reference can be used for BEST VALUE LOCATION, such as, for example, the top left pixel location, the bottom right pixel location, the center pixel, etc. It should also be apparent that the first area need not be the top left corner. The process may start with any column and any row in the column, although it is best to work incrementally across the rows and down the columns, looping back if necessary, starting from any location, as will become apparent.

Having determined a brightness value for the first region, the process continues at block 214, at which point a determination is made whether the end of the column has been reached. If not, the process continues at block 216 by subtracting the first value in the sum matrix at one end of the string of h sums and adding the next sum on the other end of the string of h sums in the matrix. Thereafter, the process continues back at block 212 where the brightness value is tested against BEST VALUE. BEST VALUE and BEST VALUE LOCATION are updated accordingly.

The step of dropping one value and adding another greatly increases the computational efficiency of the process, thereby providing an efficient method for locating the brightest region of an image. It should be noted, however, that this method of locating the brightest region is not necessary to all embodiments of the invention.

Once the end of a column is reached, the process continues at block 218 at which point a determination is made whether the end of a row has been reached. As discussed previously, this need not be the literal end of a row, although working across a row from one end to another is preferred in some embodiments. Once the end of a row is reached, the process continues at block 220 by updating the matrix of sums. The matrix of sums is updated by subtracting the grayscale value of a pixel on one end of the string of w pixels and adding the grayscale value of the next pixel on the other end of the string of w pixels. This is done for each sum down the column.

The new matrix of sums is stored at block 208, and the first h sum values are summed as before at block 210 and compared to BEST VALUE at block 212. The process continues for all columns across the image until the end of a row is reached. At that point, the process continues at block 222 by locating the watermark at BEST VALUE LOCATION.

In some embodiments, various sizes and orientations of watermarks are tested, perhaps within a range of sizes, shapes, and orientations. In such cases, an average brightness value is calculated by dividing the brightness by the number of pixels in the area. In some embodiments, border regions are disregarded such that a watermark is placed outside a specific zone or inside a specific zone. In some embodiments, if multiple locations have the same maximum brightness or values that fall within a certain threshold of each other, then all such locations are saved and a location is selected randomly from among them. Such embodiments reduce the likelihood that watermarks will be placed in the same location on several related images.

In some embodiments, standard deviation may be used to select a location. For example, if there is significant variability in the brightness of the background and/or the background is not substantially different in grayscale value from the image or data, then the area with the smallest standard deviation is selected for the watermark location. This is accomplished by first dividing the total brightness value for an area by the number of pixels in the area. Then a pixel-by-pixel standard deviation is calculated for the area. Thereafter, the area having the lowest standard deviation is selected for placement of the watermark.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A method of determining a location for a watermark on an image, wherein the image comprises an array of pixels, and wherein each pixel has image information associated therewith, the method comprising:

determining a size for the watermark, wherein the size has a pixel height and a pixel width;

calculating a region brightness value for each of a plurality of regions of the image, wherein each of the plurality of regions has a pixel height and a pixel width equal to the pixel height and the pixel width of the size of the watermark, wherein each of the plurality of regions comprises a plurality of pixels, and wherein the region brightness value is representative of the image information associated with the plurality of pixels comprised by the region, wherein calculating the region brightness value for each of the plurality of regions of the image comprises:

for a watermark of height h and width w, for a first column of pixels, calculating a row brightness value for each pixel in the column, wherein the row brightness value comprises a summation of image information for w contiguous pixels in the row;

for a first group of h contiguous pixels in the first column of pixels, calculating a region brightness value by summing the row brightness values for the h contiguous pixels in the first column of pixels;

for a second group of h contiguous pixels in the first column of pixels, calculating a region brightness value by adding one row brightness value and subtracting a different row brightness value;

for a second column of pixels, calculating a row brightness value for each pixel in the column by adding image information for one pixel and subtracting image information for a different pixel;

for a first group of h contiguous pixels in the second column of pixels, calculating a region brightness value by summing the row brightness values for the h contiguous pixels in the second column of pixels; and for a second group of h contiguous pixels in the second column of pixels, calculating a region brightness value by adding one row brightness value and subtracting a different row brightness value;

selecting one of the plurality of regions as the location for the watermark, wherein the selection is based, at least in part, on the region brightness value; and rendering the image and watermark on a display device.

2. The method of claim 1, wherein the image information for each pixel comprises a grayscale value for the pixel.

3. The method of claim 2, wherein the region brightness value for each of the plurality of regions comprises a cumulative grayscale value comprising a summation of the pixel grayscale values for the plurality of pixels in the region.

4. The method of claim 3, wherein the image comprises a black-on-white image, and wherein selecting one of the plurality of regions comprises selecting a region having a highest cumulative grayscale value.

5. The method of claim 3, wherein the image comprises a white-on-black image, and wherein selecting one of the plurality of regions comprises selecting a region having a lowest cumulative grayscale value.

6. The method of claim 1, wherein the image information for each pixel comprises color information, wherein the method further comprises obtaining brightness information from the color information.

7. The method of claim 1, wherein calculating a region brightness value for each of a plurality of regions of the image further comprises, at least in part:
- for a first column of pixels, calculating a row brightness value for each pixel in the column, wherein the row brightness value comprises a summation of image information for h contiguous pixels in the row;
- for a first group of w contiguous pixels in the first column of pixels, calculating a region brightness value by summing the row brightness values for the w contiguous pixels in the first column of pixels;
- for a second group of w contiguous pixels in the first column of pixels, calculating a region brightness value by adding one row brightness value and subtracting a different row brightness value;
- for a second column of pixels, calculating a row brightness value for each pixel in the column by adding image information for one pixel and subtracting image information for a different pixel;
- for a first group of w contiguous pixels in the second column of pixels, calculating a region brightness value by summing the row brightness values for the w contiguous pixels in the second column of pixels; and
- for a second group of w contiguous pixels in the second column of pixels, calculating a region brightness value by adding one row brightness value and subtracting a different row brightness value.

8. The method of claim 1, wherein calculating a region brightness value for each of a plurality of regions of the image comprises, at least in part:
- for a watermark of height h and width w, for a first row of pixels, calculating a column brightness value for each pixel in the row, wherein the column brightness value comprises a summation of image information for h contiguous pixels in the column;
- for a first group of w contiguous pixels in the first row of pixels, calculating a region brightness value by summing the column brightness values for the w contiguous pixels in the first row of pixels;
- for a second group of w contiguous pixels in the first row of pixels, calculating a region brightness value by adding one column brightness value and subtracting a different column brightness value;
- for a second row of pixels, calculating a column brightness value for each pixel in the row by adding image information for one pixel and subtracting image information for a different pixel;
- for a first group of w contiguous pixels in the second row of pixels, calculating a region brightness value by summing the column brightness values for the w contiguous pixels in the second row of pixels; and
- for a second group of w contiguous pixels in the second row of pixels, calculating a region brightness value by adding one column brightness value and subtracting a different column brightness value.

9. The method of claim 8, wherein calculating a region brightness value for each of a plurality of regions of the image further comprises, at least in part:
- for a first row of pixels, calculating a column brightness value for each pixel in the row, wherein the column brightness value comprises a summation of image information for w contiguous pixels in the column;
- for a first group of h contiguous pixels in the first row of pixels, calculating a region brightness value by summing the column brightness values for the h contiguous pixels in the first row of pixels;
- for a second group of h contiguous pixels in the first row of pixels, calculating a region brightness value by adding one column brightness value and subtracting a different column brightness value;
- for a second row of pixels, calculating a column brightness value for each pixel in the row by adding image information for one pixel and subtracting image information for a different pixel;
- for a first group of h contiguous pixels in the second row of pixels, calculating a region brightness value by summing the column brightness values for the h contiguous pixels in the second row of pixels; and
- for a second group of h contiguous pixels in the second row of pixels, calculating a region brightness value by adding one column brightness value and subtracting a different column brightness value.

10. A method of determining a location for a watermark on an image, wherein the image comprises an array of pixels, and wherein each pixel has a grayscale brightness value associated therewith, the method comprising:
- determining a size for the watermark, wherein the size has a pixel height h and a pixel width w;
- calculating a region brightness value for each of a plurality of regions of the image, wherein each of the plurality of regions has a pixel height and a pixel width equal to the pixel height and the pixel width of the watermark, wherein each of the plurality of regions comprises a plurality of pixels, wherein the region brightness value is a summation of the grayscale brightness values of the plurality of pixels comprised by the region, and wherein calculating a brightness value for each of a plurality of regions of the image comprises, at least in part:
  - for a first column of pixels, calculating a row brightness value for each pixel in the column, wherein the row brightness value comprises a summation of image information for w contiguous pixels in the row;
  - for a first group of h contiguous pixels in the first column of pixels, calculating a region brightness value by summing the row brightness values for the h contiguous pixels in the first column of pixels;
  - for a second group of h contiguous pixels in the first column of pixels, calculating a region brightness value by adding one row brightness value and subtracting a different row brightness value;
  - for a second column of pixels, calculating a row brightness value for each pixel in the column by adding image information for one pixel and subtracting image information for a different pixel;
  - for a first group of h contiguous pixels in the second column of pixels, calculating a region brightness value by summing the row brightness values for the h contiguous pixels in the second column of pixels; and
  - for a second group of h contiguous pixels in the second column of pixels, calculating a region brightness value by adding one row brightness value and subtracting a different row brightness value;
- selecting one of the plurality of regions as the location for the watermark, wherein the selection is based, at least in part, on the region brightness value for the region; and
- rendering the image and watermark on a display device.

11. The method of claim 10, wherein calculating a region brightness value for each of a plurality of regions of the image further comprises, at least in part:
- for a first column of pixels, calculating a row brightness value for each pixel in the column, wherein the row brightness value comprises a summation of image information for h contiguous pixels in the row;

for a first group of w contiguous pixels in the first column of pixels, calculating a region brightness value by summing the row brightness values for the w contiguous pixels in the first column of pixels;

for a second group of w contiguous pixels in the first column of pixels, calculating a region brightness value by adding one row brightness value and subtracting a different row brightness value;

for a second column of pixels, calculating a row brightness value for each pixel in the column by adding image information for one pixel and subtracting image information for a different pixel;

for a first group of w contiguous pixels in the second column of pixels, calculating a region brightness value by summing the row brightness values for the w contiguous pixels in the second column of pixels; and for a second group of w contiguous pixels in the second column of pixels, calculating a region brightness value by adding one row brightness value and subtracting a different row brightness value.

12. The method of claim 10, further comprising:

varying the values of h and w; and for each value of h and for each value of w, calculating an average region brightness value for each of a plurality of regions by:

calculating the region brightness value for the region; and dividing the region brightness value by a number of pixels in the region.

13. A system for placing a watermark on an electronic image, the system comprising:

a processor; and software that programs the processor to:

receive the electronic image, wherein the electronic image comprises an array of pixels, and wherein each pixel has image information associated therewith;

calculate a region brightness value for each of a plurality of regions of the image, wherein each of the plurality of regions has a pixel height and a pixel width equal to height and a width of the watermark, wherein each of the plurality of regions comprises a plurality of pixels, and wherein the brightness value is representative of the image information associated with the plurality of pixels comprised by the region, wherein calculating the region brightness value for each of the plurality of regions of the image comprises:

for a watermark of height h and width w, for a first column of pixels, calculating a row brightness value for each pixel in the column, wherein the row brightness value comprises a summation of image information for w contiguous pixels in the row;

for a first group of h contiguous pixels in the first column of pixels, calculating a region brightness value by summing the row brightness values for the h contiguous pixels in the first column of pixels;

for a second group of h contiguous pixels in the first column of pixels, calculating a region brightness value by adding one row brightness value and subtracting a different row brightness value;

for a second column of pixels, calculating a row brightness value for each pixel in the column by adding image information for one pixel and subtracting image information for a different pixel;

for a first group of h contiguous pixels in the second column of pixels, calculating a region brightness value by summing the row brightness values for the h contiguous pixels in the second column of pixels; and for a second group of h contiguous pixels in the second column of pixels, calculating a region brightness value by adding one row brightness value and subtracting a different row brightness value;

select one of the plurality of regions as the location for the watermark, wherein the selection is based, at least in part, on the brightness value for the region;

place the selected watermark at the location; and store the watermarked image; and an image server, configured to:

host watermarked images;

advertise the availability of the watermarked image to customers; and provide the watermarked image to a customer upon request.

14. The system of claim 13, wherein the image information for each pixel comprises a grayscale value for the pixel.

15. The system of claim 14, wherein in programming the processor to calculate a region brightness value for each of the plurality of regions, the software programs the processor to sum the pixel grayscale values for the plurality of pixels in the region.

16. The system of claim 14, wherein the image comprises a black-on-white image, and wherein in programming the processor to select one of the plurality of regions, the software programs the processor to select a region having a highest cumulative grayscale value.

17. The system of claim 14, wherein the image comprises a white-on-black image, and wherein in programming the processor to select one of the plurality of regions, the software programs the processor to select a region having a lowest cumulative grayscale value.

18. The system of claim 13, wherein the image information for each pixel comprises color information, wherein the software further programs the processor to obtain brightness information from the color information.

* * * * *